(12) United States Patent
Keith et al.

(10) Patent No.: US 8,077,321 B1
(45) Date of Patent: Dec. 13, 2011

(54) SYSTEM TO REDUCE GYROSCOPIC ERRORS WITH LIMITED POWER SUPPLY QUALITY IN A FIBER OPTIC GYROSCOPE

(75) Inventors: Gregory W Keith, Glendale, AZ (US); Paul Schwerman, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 78 days.

(21) Appl. No.: 12/813,993

(22) Filed: Jun. 11, 2010

(51) Int. Cl.
*G01C 19/72* (2006.01)
(52) U.S. Cl. ........................ 356/460
(58) Field of Classification Search .......... 356/459, 356/460; 73/504.01
See application file for complete search history.

(56) References Cited

U.S. PATENT DOCUMENTS

| | | | |
|---|---|---|---|
| 4,484,331 A | 11/1984 | Miller | |
| 5,052,808 A | * | 10/1991 | Hilby et al. .................. 356/464 |
| 5,412,474 A | | 5/1995 | Reasenberg et al. |
| 5,963,570 A | | 10/1999 | Gnauck et al. |
| 6,587,490 B2 | | 7/2003 | Crawford |

OTHER PUBLICATIONS

Keith et al., U.S. Appl. No. 12/640,931, "System to Reduce Gyroscopic Errors With Limited Power Supply Quality in a Fiber Optic Gyroscope", filed Dec. 17, 2009.

* cited by examiner

*Primary Examiner* — Michael A Lyons
*Assistant Examiner* — Jonathan Hansen
(74) *Attorney, Agent, or Firm* — Fogg & Powers LLC

(57) ABSTRACT

One embodiment is directed to a power supply for a fiber optic gyroscope that comprises at least one main power supply, at least one demodulator local power supply to operatively couple the main power supply to a demodulator included in the fiber optic gyroscope, and at least one modulator local power supply to operatively couple the main power supply to a bias modulator included in the fiber optic gyroscope. The demodulator local power supply comprises a first current source to source current to the demodulator and a first shunt regulator coupled across a load associated with the demodulator. The modulator local power supply comprises a second current source to source current to the bias modulator and a second shunt regulator coupled across a load associated with the bias modulator.

19 Claims, 3 Drawing Sheets

SYSTEM TO REDUCE GYROSCOPIC ERRORS WITH LIMITED POWER SUPPLY QUALITY IN A FIBER OPTIC GYROSCOPE

STATEMENT REGARDING FEDERALLY SPONSORED RESEARCH OR DEVELOPMENT

This invention was made with Government support under contract number FA9453-08-C-0263 awarded by Air Force Research Labs. The Government has certain rights in the invention.

BACKGROUND

An Interferometric Fiber Optic Gyroscope (IFOG), which utilizes counter-propagating electromagnetic waves in a fiber optic coil to sense rotation about the coil, can be susceptible to electronic noise. Such a fiber optic gyroscope uses a bias modulation to bias the gyroscope on a rate sensitivity portion of an interferogram. The bias modulation frequencies can couple into the demodulation circuitry and cause increased bias offset and deadband. For example, any coherent (in phase) noise that presents at the demodulation analog-to-digital converter is a source of error, affecting bias stability, bias offset, and size of gyroscope deadband.

While conventional IFOG electronics adequately filter out power supply noise and internal noise, such IFOG electronics require a grounding scheme with a quiet low impedance chassis ground connection as reference for the power supplies. While this approach works in a gimbaled sphere, where the gyroscopes are rotated using sliprings for power and data transmission, next generation inertial reference systems will not use sliprings, but instead will employ wireless technology for both data and power transmission. This wireless approach removes the chassis (earth) ground connection and could allow the electronics to be susceptible to noise due to a floating power supply reference.

While it is possible to use separate power supplies for the bias modulation and corresponding demodulation circuitry and separate power supplies for each IFOG axis, this is not practical mostly due to size and power dissipation increases. The size of both the external power supply and the internal circuitry from multiple separated power supplies would be prohibitive. Moreover, the extra power dissipation from multiple power supplies would also be a burden to the normally small system power budget. In addition, requiring an inertial reference system to provide power to the gyroscope with very low ripple voltage is not always practical.

SUMMARY

One embodiment is directed to a power supply for a fiber optic gyroscope that comprises at least one main power supply, at least one demodulator local power supply to operatively couple the main power supply to a demodulator included in the fiber optic gyroscope, and at least one modulator local power supply to operatively couple the main power supply to a bias modulator included in the fiber optic gyroscope. The demodulator local power supply comprises a first current source to source current to the demodulator and a first shunt regulator coupled across a load associated with the demodulator. The modulator local power supply comprises a second current source to source current to the bias modulator and a second shunt regulator coupled across a load associated with the bias modulator.

DRAWINGS

DETAILED DESCRIPTION

Figure 1:
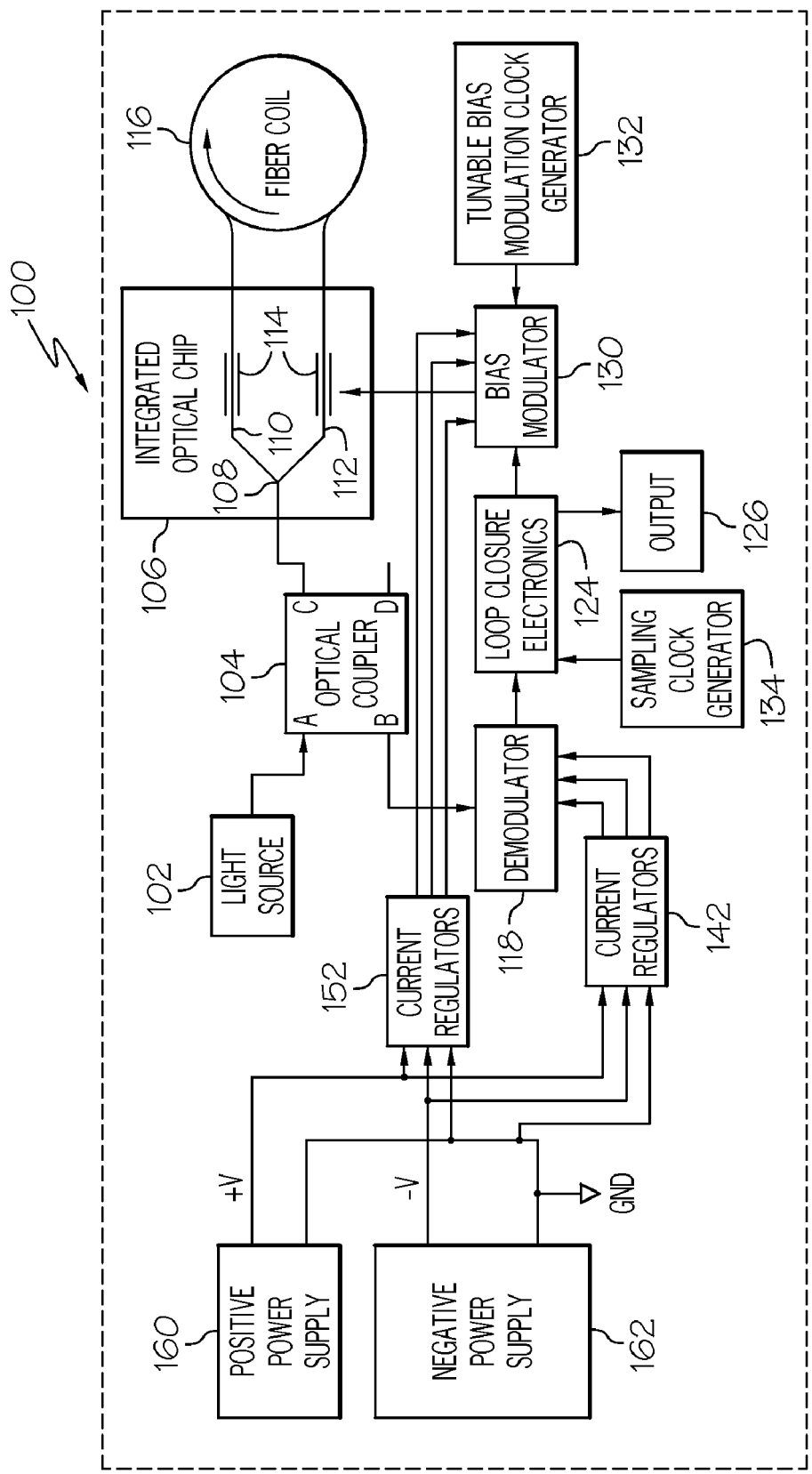
FIG. 1 illustrates one exemplary embodiment of a single fiber optic gyroscope (FOG) axis.

FIG. 1 illustrates one exemplary embodiment of a fiber optic gyroscope (FOG) 100, such as an interferometer FOG. The FOG 100 generally includes a light source 102, an optical coupler 104, an optical modulator 106, a fiber optic coil 116, a demodulator 118, a loop closure electronics module 124, a bias modulator 130, a positive power supply 160, and a negative power supply 162. In addition, one or more current regulators 142 are coupled to demodulator 118, and one or more current regulators 152 are coupled to bias modulator 130. Each of these components is discussed in further detail as follows.

The light source 102 can be any suitable light source for propagating optical through FOG 100. For example, light source 102 can be implemented using a pump laser. The light source 102 is in optical communication with optical coupler 104 by using a suitable optical path such as an optical fiber.

The optical coupler 104 has light transmission media which extend between four ports A, B, C and D. Port A is connected to light source 102, port B is connected to the demodulator 118, and port C is coupled to optical modulator 106. In general, when optical coupler 104 receives optical waves at any of its ports, optical coupler 104 propagates the waves such that approximately half of the transmitted light appears at each of the two ports on the opposite end of the incoming port. At same time, substantially no optical waves are propagated to the port which is at the same end as the incoming port. For example, light received at port A will be transmitted to ports C and D, but will not be substantially propagated to port B. Similarly, light received at port C will be propagated to ports A and B, but not to port D.

During operation, light source 102 transmits light to port A of optical coupler 104. The optical coupler 104 splits the transmitted light and provides the light to ports C and D. The light transmitted to port C is further propagated to optical modulator 106 via an optical fiber or other suitable mechanism.

The optical modulator 106, which can be an integrated optical chip, includes a Y-junction 108 and a pair of waveguides 110, 112. Additionally, optical modulator 106 includes a plurality of optical phase modulator electrodes 114 integrated with the waveguides 110, 112. When light is propagated to optical modulator 106, the light is further split at Y-junction 108 and fed to waveguides 110, 112. The light in wave guide 110 is propagated to fiber optic coil 116, where it propagates clockwise around the length of fiber optic coil 116, and returns to wave guide 112. Likewise, the light in wave guide 112 is propagated to fiber optic coil 116, where it propagates both clockwise and counter-clockwise around the length of fiber optic coil 116, and returns to wave guide 110 in optical coupler 106.

The fiber optic coil 116 is typically wound around a core and about an axis around which rotation is sensed. The fiber optic coil 116 provides a closed optical path in which the light propagates in opposite directions, ultimately impinging on a detector in demodulator 118. Rotation about the sensing axis in one direction causes an effective increase in the optical path length for one direction, and a decrease in the optical path length in the other direction. The optical path length difference introduces a phase shift between the light waves, a result known as the Sagnac effect.

After being propagated from fiber optic coil 116 and passing through their respective wave guides, the light waves are combined at the Y-junction 108 and propagate to optical coupler 104. The combined light waves are output to demodulator 118. The detector in demodulator 118 can be a photodetector, such as an appropriate photodiode and a suitable amplifier, or other suitable detector, which converts the optical signal of the light waves to an electrical signal. The detector outputs the electrical signal, which is proportional to the intensity of the two light waves impinging on the detector.

The electrical signal output from demodulator 118 is passed to loop closure electronics module 124. In general, loop closure electronics module 124 receives the current from the detector and drives optical modulator 106 to a feedback phase shift needed to keep a difference in intensity for two measurements of the interferometer at zero. Thus, the rotation rate measurement can be calculated from the feedback phase and delivered as an output 126.

When the two counter propagating waves impinge on the detector, the output from the detector follows the cosine of the phase difference between the two waves. The phase difference between the two waves is modulated with bias modulator 130. The bias modulator 130 introduces a phase bias modulation by applying a phase shift to the incoming and outgoing waves in the optical modulator 106. Bias modulator 130 outputs a square wave electrical signal that is used as a modulating voltage across electrodes 114 in optical modulator 106. The application of voltage lengthens or shortens the effective optical path length, thereby introducing an optical phase shift proportional to the applied voltage. In one implementation of the embodiment shown in FIG. 1, the bias modulator 130 outputs a 20 kiloHertz square wave for phase modulating the optical signal.

The bias modulation causes the detection points in the interferometer to shift, such that the detector no longer measures the intensity at the top of the interferometer, but rather at two offset points. The rotation rate, measured at the detector, is then proportional to the difference in the emitted intensity at the two offset points. The period of the bias modulation signal is tunable to half of the loop transit time of the light through the coil, such that the counter-propagating wave encounters the opposite modulation as the outgoing wave when it returns to optical modulator 106. When implemented, such a modulation scheme phase advances the incoming wave and retards the outgoing wave, such that the two waves interfere when combined at Y-junction 108.

The frequency of the bias modulation signal is controlled by a tunable bias modulation clock generator 132.

As described above, the detector in demodulator 118 receives the waves from optical coupler 104 and provides an output current proportional to the intensity of the two waves. The output of demodulator 118 is passed to loop closure electronics 124. The loop closure electronics 124 samples the output of demodulator 118 to determine the intensity of the two waves. The sampling of the output of demodulator 118 is controlled by a sampling clock, which is created by a sampling clock generator 134. The sampling clock is selected to have a frequency that will result in the desired number of samples per half-period of the bias modulation clock.

An "active inductor" (also referred to here as "current source power supply") scheme is implemented in FOG 100 to reduce or eliminate common mode and differential mode noise that couple from the bias modulation circuitry to the demodulation circuitry and from the power supplies to the demodulation circuitry and to the bias modulation circuitry. As a result, the power supply voltages provided to the FOG 100 can be relatively more noisy since power supply ripple is less likely to be coupled into both the gyro data and the gyro grounding system.

The active inductor scheme is implemented using one or more "local" power supplies 142 to couple the "main" power supplies 160 and 162 to the demodulator 118, and one or more "local" power supplies 152 to couple the "main" power supplies 160 and 162 to the bias modulator 130. The local power supplies 142 and 152 are described here as being implemented as current regulators 142 and 152. The current regulators 142 are used to couple the positive voltage (+V) output by the positive power supply 160 to the demodulator 118. The current regulators 142 are also referred to here as the "demodulator current regulators" 142. Similarly, the current regulators 152 are used to couple the positive voltage (+V) output by the positive power supply 160 to the bias modulator 130. The current regulators 152 are also referred to here as the "bias modulator current regulators" 152. The current regulators 142 and 152 also couple a common ground (GND) reference to the demodulator 118 and the bias modulator 130, respectively.

Although the current regulators 142 and 152 are described here in relation to isolating the positive power supply 160 from the demodulator 118 and the bias modulator 130, it is to be understood that the current regulators 142 and 152 can also be used in the same general manner to isolate the negative power supply 162 from the demodulator 118 and the bias modulator 130.

The current regulator 142 used to couple the positive voltage (+V) output by the positive power supply 160 to the demodulator 118 includes a current source 202 to source current associated with the positive voltage (+V). The current regulator 142 shown in FIG. 2 also includes a shunt regulator 204 that maintains a constant voltage across itself and the load (that is, the demodulator 118) when the current through the shunt regulator 204 is sufficiently high. Likewise, the current regulator 152 used to couple the positive voltage (+V) output by the positive power supply 160 to the bias modulator 130 includes a current source 206 to source current associated with the positive voltage (+V) of the positive power supply 160. The current regulator 152 also includes a shunt regulator 208 that maintains a constant voltage across itself and the load (that is, the bias modulator 130) when the current through the shunt regulator 208 is sufficiently high.

The shunt regulators 204 and 208 both limit the voltage across the respective current source 202 and 206 from load current ripple and provide a local low impedance supply voltage for the demodulator 118 and modulator 130, respectively. Also, current sources 202 and 206 provide high impedance coupling from the respective shunt regulator 204 and 208 to the respective main power supply 160 so the small ripple voltage across the respective shunt regulator 204 and 208 becomes an even smaller current ripple into the main power supply 160. Moreover, the current sources 202 and 206 also attenuate the current ripple induced by voltage ripple on the main power supply 160 so the impedance of the shunt regulators 204 and 208 can provide high attenuation to noise on the main power supply 160.

Each of the current regulators 142 and 152 provide an effective inductance to the respective load that is larger than what could be provided using typical passive filter circuits of the same size and weight. Moreover, each of the current regulators-shunt regulator pairs 142 and 152 provides a path to ground for the respective return current that is separate from the return-current paths provided by the other current regulators-shunt regulator pairs. That is, regulator pair 152 provides a ground path for the bias modulator return current ($I_{MODULATOR}$) that is separate from the ground path that is provided by regulator pair 142 for the demodulator return current ($I_{DE-MODULATOR}$). As a result, "noisy" currents associated with the bias modulator 130 can be more effectively attenuated and isolated so that they have less of an impact on the demodulator 118.

Figure 2:
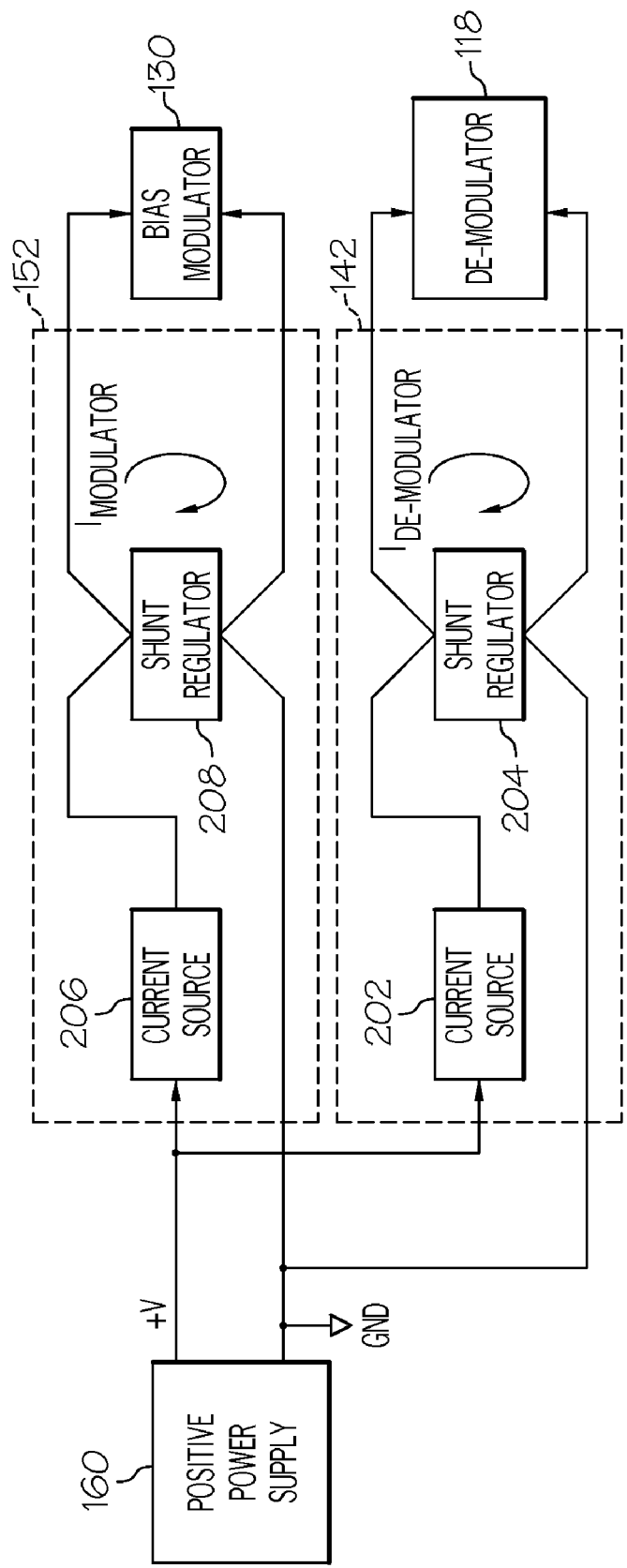
FIG. 2 is a block diagram illustrating one example of the current regulators shown in FIG. 1.
Figure 3:
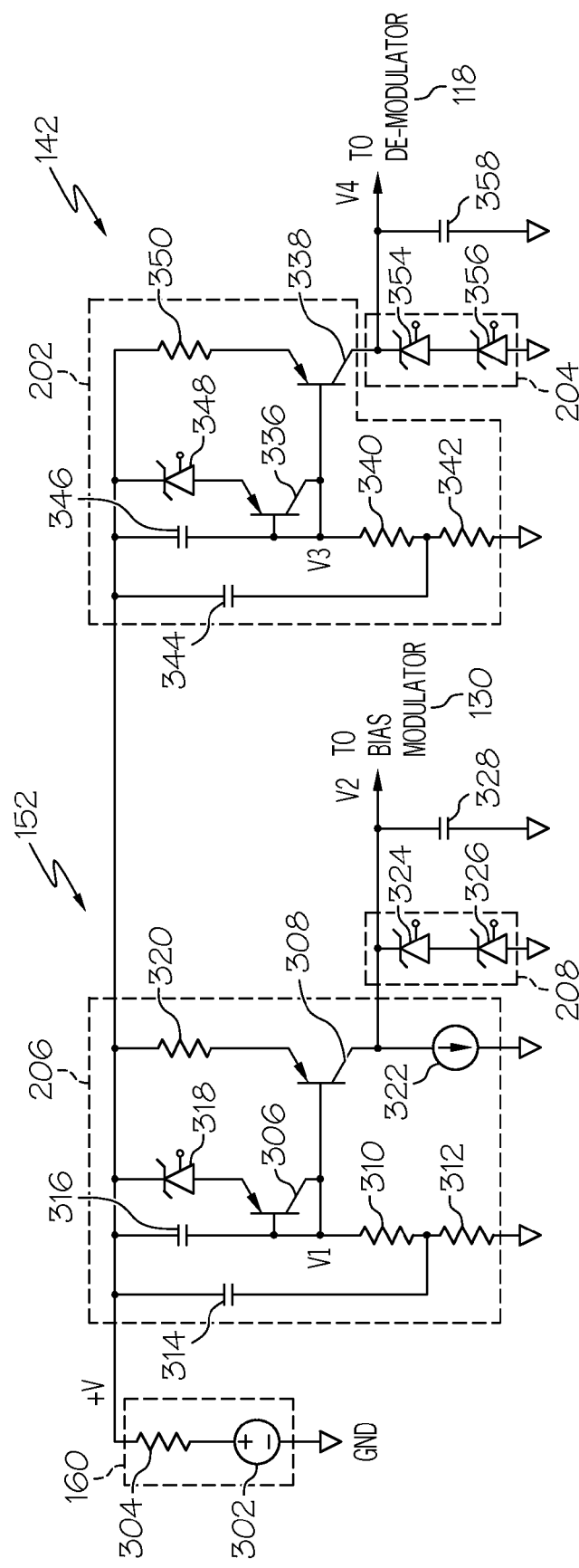
FIG. 3 is a block diagram of one exemplary implementation of the current regulators and shown in FIG. 2.

FIG. 3 is a block diagram of one exemplary implementation of the current regulators-shunt regulator pair 142 and 152 shown in FIG. 2. That is, FIG. 3 shows one exemplary implementation of the current regulators 142 and 152 used to couple the positive voltage (+V) output by the positive power supply 160 to the demodulator 118 and to the bias modulator 130, respectively.

As shown in FIG. 3, the positive power supply 160 includes a direct current (DC) voltage source 302 and a resistor 304.

In the example shown in FIG. 3, the current source 206 of the current regulator 152 is implemented using a pair of PNP bipolar transistors 306 and 308, where the base and collector of the first transistor 306 and the base of the second transistor 308 are coupled to a common bias voltage provided by a pair of bias resistors 310 and 312.

A bypass capacitor 314 is coupled between the positive voltage (+V) rail and the junction between the two bias resistors 310 and 312 to increase the +V ripple rejection. Another bypass capacitor 316 is coupled between the positive (+V) rail and the common bias voltage for additional noise reduction. A voltage reference 318 (implemented using, for example, a reverse-biased zener diode) is coupled between the positive voltage (+V) rail and the emitter of the first transistor 306.

A resistor 320 is coupled between the positive voltage (+V) rail and the emitter of the second transistor 308 to set the dc output current level of the current source and to increase the output impedance of said current source. The techniques described here are used to prevent noise current generated by Bias Modulator 130 from reaching the de-modulator 118. In the example, shown in FIG. 3, such noise current is represented as an alternating current (AC) current source 322 coupled between the collector of the second transistor 308 and ground (GND).

The current source 206 of the current regulator 152 is configured so that the voltage (V1) at the output of the current source 206 is equal to or greater than the common bias voltage (V2) at DC with the current source 206 having a high impedance at AC for a wide frequency range (including at least the frequency range of interest). Also, as noted above, the current regulator 142 provides an effective inductance to the load that is larger than what could be provided using typical passive filter circuits of the same size and weight.

In the example shown in FIG. 3, the shunt regulator 208 is implemented using a pair of reverse-biased zener diodes 324 and 326. Also, in the example shown in FIG. 3, a bypass capacitor 328 is coupled across the output of the current regulator 152 and ground (GND) in order to decouple the bias modulator 130 from the current regulator 152.

In the example shown in FIG. 3, the current source 202 of the current regulator 142 is implemented in a similar manner as the current source 206 of the current regulator 152. Current source 202 is implemented using a pair of PNP bipolar transistors 336 and 338, where the base and collector of the transistor 336 and the base of the transistor 338 are coupled to a common bias voltage (V3) provided by a pair of bias resistors 340 and 342.

A capacitor 344 is coupled between the positive voltage (+V) rail and the junction between the two bias resistors 340 and 342 to increase the +V ripple rejection. Another capacitor 346 is coupled between the positive (+V) rail and the common bias voltage (V3) for additional noise reduction. A voltage reference 348 (implemented using, for example, a reverse-biased zener diode) is coupled between the positive voltage (+V) rail and the emitter of the transistor 336.

A resistor 350 is coupled between the positive voltage (+V) rail and the emitter of the transistor 338. Resistor 350 and voltage reference 348 set the output level of the current source 202.

The current source 202 of the current regulator 142 is configured so that the voltage (V4) at the output of the current source 202 is less than or equal to the common bias voltage (V3) at DC with the current source 202 having a high impedance at AC for a wide frequency range (including at least the frequency range of interest). Also, as noted above, the current regulator 142 provide an effective inductance to the load that is larger than what could be provided using typical passive filter circuits of the same size and weight.

In the example shown in FIG. 3, the shunt regulator 204 is implemented using a pair of reverse-biased zener diodes 354 and 356. Also, in the example shown in FIG. 3, a capacitor 358 is coupled across the output of the current regulator 142 and ground (GND) in order to decouple the demodulator 118 from the current regulator 142.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A fiber optic gyroscope, comprising:
an optical coupler in optical communication with and configured to receive an optical signal from a light source;
an optical modulator in optical communication with the optical coupler;
a fiber optic coil in optical communication with the optical modulator;
a demodulator configured to receive an optical signal from the optical coupler and convert the optical signal to an electrical signal;
a bias modulator configured to output a modulation signal to the optical modulator;
at least one main power supply;
a demodulator local power supply operatively coupled to a first shunt regulator, wherein the demodulator local power supply feeds the first shunt regulator with a current source to operatively couple the main power supply to the demodulator; and
a modulator local power supply operatively coupled to a second shunt regulator, wherein the modulator local power supply feeds the second shunt regulator with a current source to operatively couple the main power supply to the bias modulator.

2. The fiber optic gyroscope of claim 1, wherein the light source is a part of the fiber optic gyroscope.

3. The fiber optic gyroscope of claim 2, wherein the light source comprises a laser.

4. The fiber optic gyroscope of claim 1, wherein the optical modulator comprises an integrated optical chip.

5. The fiber optic gyroscope of claim 1, wherein the demodulator local power supply comprises a first current source to source current to the demodulator and wherein the modulator local power supply comprises a second current source to source current to the bias modulator.

6. The fiber optic gyroscope of claim 5, wherein the first shunt regulator is coupled across a load associated with the demodulator, and wherein the second shunt regulator is coupled across a load associated with the bias modulator.

7. The fiber optic gyroscope of claim 1, wherein the at least one main power supply comprises a main positive power supply to output a positive voltage and a main negative power supply to output a negative voltage.

8. The fiber optic gyroscope of claim 7, wherein the demodulator local power supply comprises a first current regulator-shunt regulator pair to couple the main positive power supply to the demodulator and a first additional current regulator-shunt regulator pair to couple the main negative power supply to an additional demodulators; and
wherein the modulator local power supply comprises a second current regulator-shunt regulator pair to couple the main positive power supply to the bias modulator and a second additional current regulator-shunt regulator pair to couple the main negative power supply to an additional bias modulator.

9. The fiber optic gyroscope of claim 1, wherein the demodulator local power supply and the modulator local power supply are connected to a common ground reference.

10. The fiber optic gyroscope of claim 1, wherein the fiber optic gyroscope is an interferometric fiber optic gyroscope.

11. A power supply for a fiber optic gyroscope, comprising:
at least one main power supply;
at least one demodulator local power supply to operatively couple the main power supply to a demodulator included in the fiber optic gyroscope; and
at least one modulator local power supply to operatively couple the main power supply to a bias modulator included in the fiber optic gyroscope;
wherein the demodulator local power supply comprises a first current source to source current to the demodulator and a first shunt regulator coupled across a load associated with the demodulator; and
wherein the modulator local power supply comprises a second current source to source current to the bias modulator and a second shunt regulator coupled across a load associated with the bias modulator.

12. The power supply of claim 11, wherein the at least one main power supply comprises a main positive power supply to output a positive voltage and a main negative power supply to output a negative voltage.

13. The power supply of claim 12, wherein the demodulator local power supply comprises a first current regulator-shunt regulator pair to couple the main positive power supply to the demodulator and a second current regulator-shunt regulator pair to couple the main negative power supply to the demodulator; and
wherein the modulator local power supply comprises a third current regulator-shunt regulator pair to couple the main positive power supply to the bias modulator and a fourth current regulator-shunt regulator pair to couple the main negative power supply to the bias modulator.

14. The power supply of claim 11, wherein the demodulator local power supply and the bias modulator local power supply are connected to a common ground reference.

15. The power supply of claim 11, wherein the demodulator local power supply comprises a current regulator-shunt regulator pair to couple the main power supply to the demodulator and the bias modulator does not use a current regulator-shunt regulator pair to couple the main power supply to the bias modulator.

16. The power supply of claim 11, wherein the demodulator local power supply does not use a current regulator-shunt regulator pair to couple the main power supply to the demodulator and the bias modulator local power supply comprises a current regulator-shunt regulator pair to couple the main power supply to the bias modulator.

17. The power supply of claim 11, wherein the fiber optic gyroscope is an interferometric fiber optic gyroscope.

18. The power supply of claim 11, wherein the demodulator local power supply comprises a first current regulator-shunt regulator pair to couple the main power supply to the demodulator and an additional current regulator-shunt regulator pair to couple the main power supply to an additional demodulator.

19. The power supply of claim 11, wherein the bias modulator local power supply comprises a first current regulator-shunt regulator pair to couple the main power supply to the bias modulator and an additional current regulator-shunt regulator pair to couple the main power supply to an additional bias modulator.

* * * * *